United States Patent Office 3,705,973
Patented Dec. 12, 1972

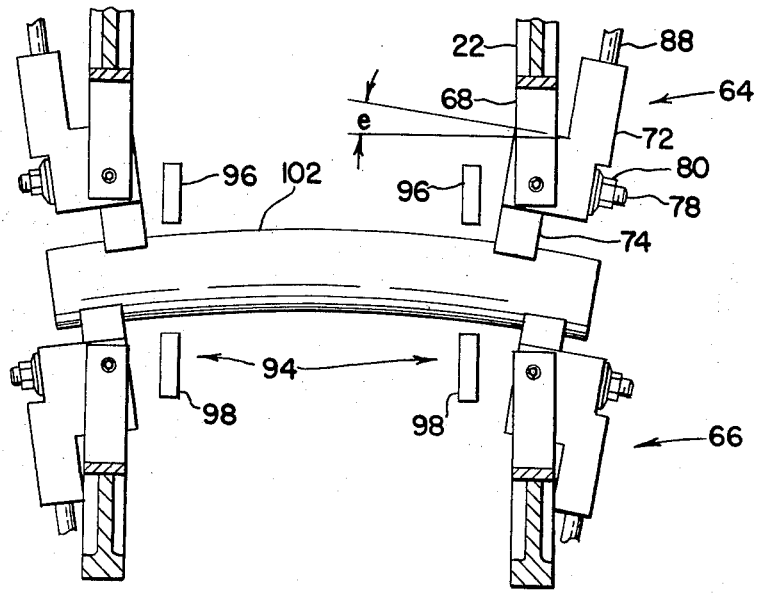
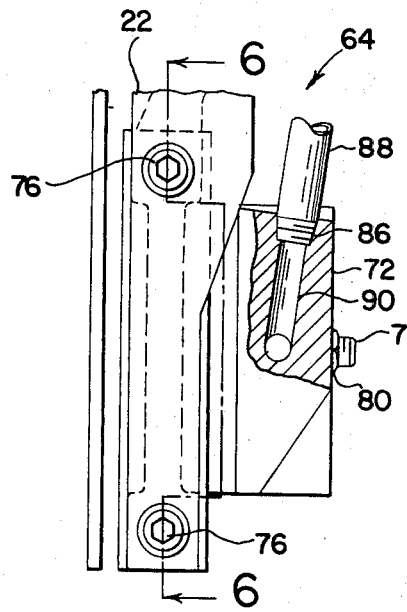
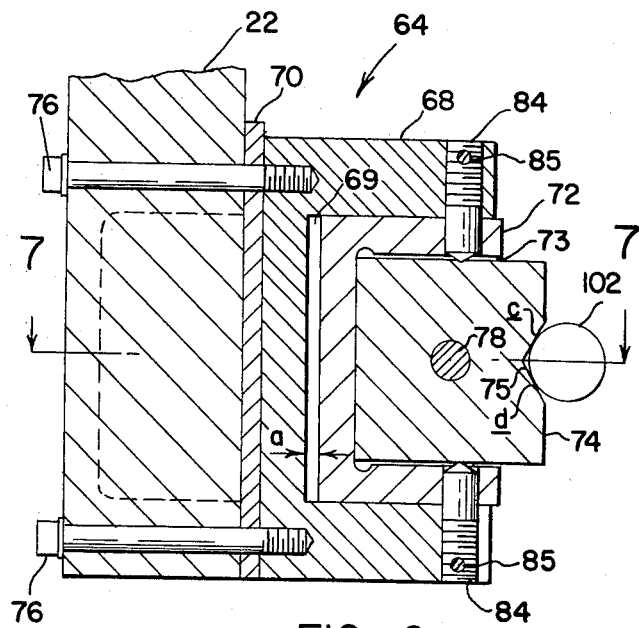
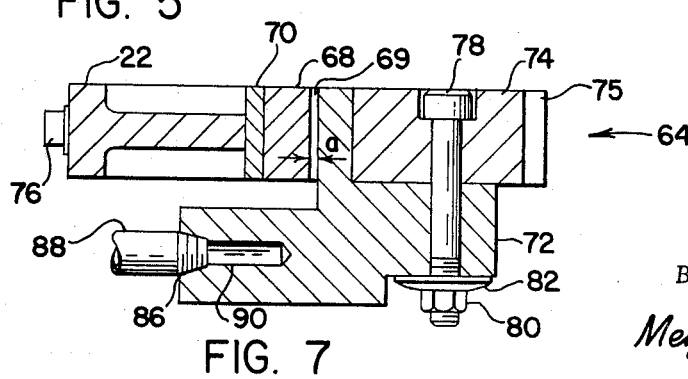
FIG. 4
FIG. 5
FIG. 6
FIG. 7
INVENTORS
NORBERT R. BALZER
JOSEPH E. ARNOSKY
BY
Meyer, Tilberry & Body
ATTORNEYS

3,705,973
RESISTANCE HEATING APPARATUS FOR ELONGATED WORKPIECES
Norbert R. Balzer, Parma, and Joseph E. Arnosky, Broadview Heights, Ohio, assignors to Park-Ohio Industries, Inc., Cleveland, Ohio
Filed Dec. 29, 1970, Ser. No. 102,299
Int. Cl. H05b 1/00
U.S. Cl. 219—156          11 Claims

ABSTRACT OF THE DISCLOSURE

An apparatus for resistance heating an elongated workpiece wherein the shaft is transversely gripped between two spaced apart resistance heating contacts. Each contact includes first and second portions having shaft receiving areas in order to increase the effective gripping and heating area between the contacts and shaft. Each portion is pivotally mounted to a contact arm so as to be arcuately moveable in a plane perpendicular to the shaft. The contact arms extend generally transverse to the shaft and the associated arms for each first and second portion include force means for moving the arms between a first opened position and a second heating position wherein the contact portions clampingly engage the workpiece. The arcuate movement provided for each contact portion permits substantial contact-workpiece area contact for a workpiece having substantial transverse run-out.

---

This application pertains to the art of resistance heating and more particularly to a resistance heating apparatus for elongated workpieces.

The invention is particularly applicable for use in resistance heating elongated generally cylindrical workpieces, such as metal shafts and will be described with particular reference thereto; however, it will be appreciated by those skilled in the art that the invention has broader applications and may be used in other applications where it is desired to employ resistance type heating to an elongated workpiece having any cross-sectional configuration.

Heretofore, resistance heating apparatus which have been employed for resistance heating elongated workpieces are comprised of two spaced apart resistance heating contacts. Each contact included two opposed contact portions wherein at least one portion of each contact was moveable towards and away from its associated portion. In operation, a workpiece was first placed between the portions in the desired spaced relationship therewith. The moveable portions of each contact were then directed towards their associated portions so as to clamp the workpiece therebetween. A heating current was then applied to the workpiece through the heating contacts by means of an outside current supply source. Following heating, the moveable portions were retracted to allow removal of the heated workpiece and insertion of a new workpiece for heating.

The amount of surface contact between the workpiece and the heating contacts is particularly important in resistance type heating in that the greater the area of surface contact which can be obtained, the greater the degree of efficiency of the overall heating operation. The surface contact problem is particularly acute when elongated generally metal shafts are heated. To provide substantial surface contact between the contacts and a workpiece, it has been previously proposed to provide each contact portion with a V-shaped workpiece receiving area such that there were essentially four areas of line contact between each contact and the workpiece. Although these V-shaped workpiece receiving areas did improve somewhat the degree of surface contact attained between the contacts and a workpiece, problems were encountered in heating workpieces having transverse run-out.

The transverse run-out problem is particularly significant in that in actuality, the workpieces being heated are quite frequently merely lengths of stock cut from hot rolled or cold rolled steel bars. Therefore, a definite and distinct possibility exists that the lengths will have at least some transverse run-out. With the prior apparatus, a workpiece having anything greater than an insignificant amount of transverse run-out, however, lowered the heating efficiency of the apparatus since such warped workpieces, when located between the contact portion receiving recesses, could only establish limited surface contact therewith. This decrease in heating efficiency required that either additional electrical energy be supplied or that the heating times be increased as a means for compensating for the inefficiency, both of which increased operating costs. Gaps created between the contacts and those workpieces having run-out caused arcing between the two to further decrease heating efficiency and caused pitted areas to be formed in the contact portions themselves.

The present invention contemplates a new and improved apparatus which overcomes all of the above referred problems and others generally associated therewith and provides a new apparatus for resistance heating of elongated shafts which increases the resistance heating efficiency, increases production outputs and assures identical heating for all workpieces.

In accordance with the present invention, there is provided a resistance heating apparatus for heating a workpiece which includes first and second spaced-apart workpiece heating contacts. Each contact includes first and second contact portions mounted on individual contact arms for movement between a first spaced-apart position and a second element clamping and heating position. Each contact includes means for providing at least three areas of line contact between the workpiece and the associated contact portions when they are in the second clamping and heating position. Further, means are provided for compensating for workpiece run-out by mounting each portion to its associated arm so as to permit arcuate movement of the portion in a plane perpendicular to the workpiece.

In accordance with a more limited aspect of the present invention, there is provided an improved heating contact mounting means in order to permit arcuate movement of the contact portions to self adjust to a workpiece having transverse run-out.

The principal object of the present invention is the provision of a resistance heating apparatus for heating elongated workpieces which apparatus increases resistance heating efficiency for workpieces having transverse run-out.

Another object of the present invention is the provision of a resistance heating apparatus for heating elongated workpieces which is simple and easier to service than prior apparatus.

Still another object of the present invention is the provision of a resistance heating apparatus which includes means for permitting longitudinal contact movement in order to compensate for longitudinal workpiece expansion during heating.

Yet another object of the present invention is the provision of an improved contact mounting means which permits efficient resistance heating of elongated workpieces having transverse run-out.

The invention may take physical form in certain parts and arrangements of parts, a preferred embodiment of which will be described in detail in this specification and illustrated in the accompanying drawings which form a part hereof and wherein:

FIG. 4 is an exaggerated front view showing the contacts receiving an element having transverse run-out;

FIG. 5 is an enlarged plan view showing the mounting of a contact portion;

FIG. 6 is a cross-sectional view taken along lines 6—6 in FIG. 5;

FIG. 7 is a cross-sectional view taken along lines 7—7 in FIG. 6; and

Figure 1:
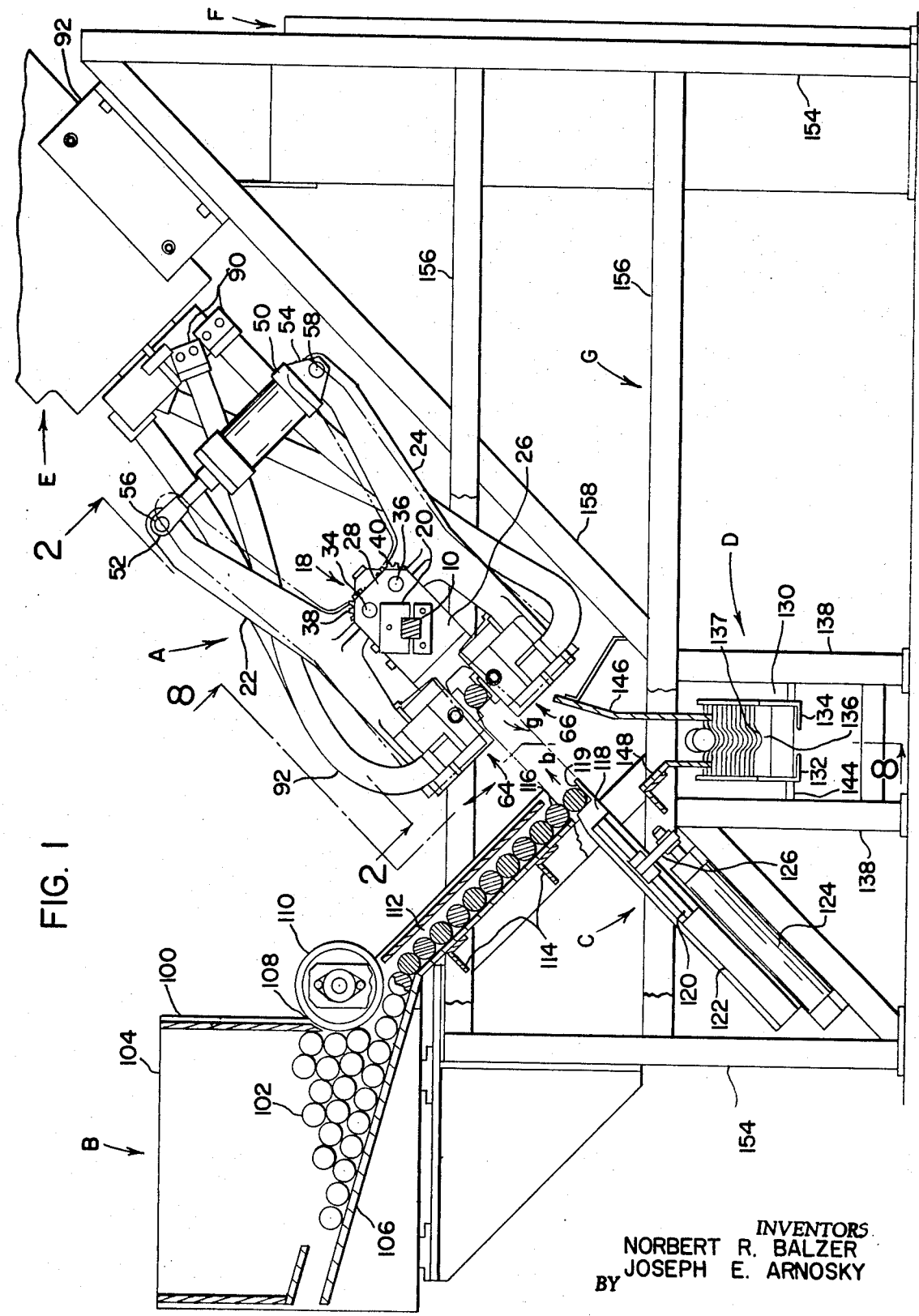
FIG. 1 is a side elevation view of the apparatus of this invention.

Referring now to the drawings wherein the showings are for the purposes of illustrating the preferred embodiment of the invention only and not for purposes of limiting same, the figures show a resistance heating apparatus which includes resistance heating portion A, workpiece supply area B, workpiece feed system C, workpiece removal system D, electrical supply area E and apparatus control area F. Each of these assemblies is mounted or located relative to the others by framework G.

Figure 2:
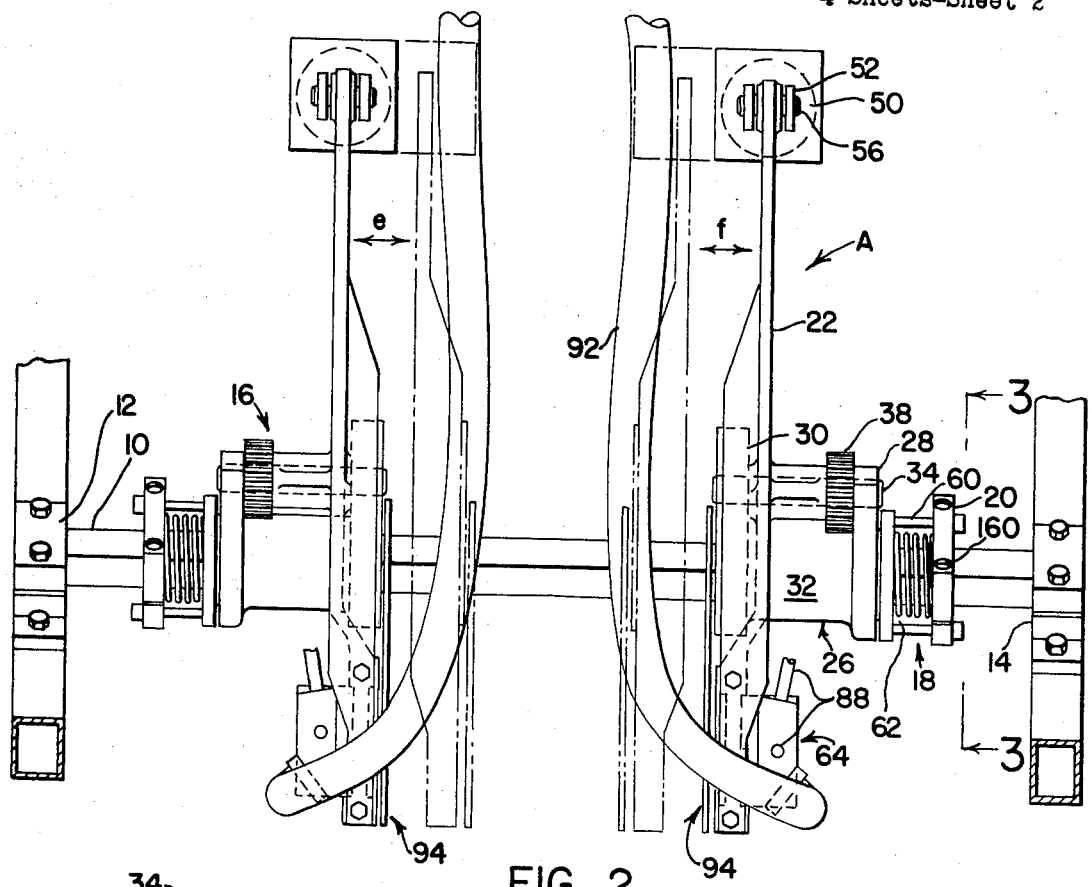
FIG. 2 is a top view of the apparatus shown in FIG. 1 taken along lines 2—2.

Referring specifically to FIGS. 1 and 2, it will be seen that resistance heating portion A is mounted to frame G by means of resistance heating portion mounting shaft 10. It will be seen that in the preferred embodiment, shaft 10 is of a rectangular cross-sectional configuration and is received in shaft retaining brackets 12, 14 which retain the shaft in position on framework G. Also received on shaft 10, are contact arm assemblies generally designated 16, 18. Each of these assemblies is identical to and opposite from the other so the description hereinafter following will be specifically with reference to assembly 18, it being understood that assembly 16 is identical thereto except where specifically noted.

Figure 3:
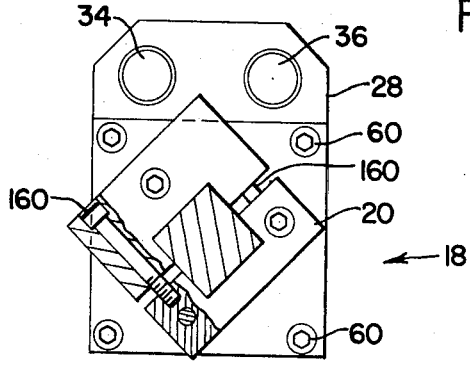
FIG. 3 is a partial cross-sectional view taken along lines 3—3 in FIG. 2.

Assembly 18 includes a contact arm shaft bracket 20 best shown in FIG. 3. Bracket 20 is adjustable from a tightened relationship relative to shaft 10 to an untightened relationship therewith so that the entire assembly 18 may be moved longitudinally along the mounting shaft in order that the apparatus may be adapted to workpieces of varying lengths. Upper and lower contact arms 22, 24 are fabricated from aluminum in the preferred embodiment in order to provide a non-magnetic material near the current conductors and are pivotally mounted to a contact arm housing generally designated 26. Housing 26 includes an outer mounting flange area 28, inner mounting flange area 30 and housing body 32. Extending between flange areas 28, 30 are upper contact arm mounting shaft 34 and lower contact arm mounting shaft 36. Arms 22, 24 are received on shafts 34, 36 respectively in a conventional manner. In order that the arms will have synchronized movement, shafts 34, 36 respectively include upper arm synchronizing gear 38 and lower arm synchronizing gear 40 which, in the preferred embodiment, are merely intermeshing spur gears. Other synchronizing means could, of course, be employed.

One of the extremities of each contact arm 22, 24 is interconnected through means of a contact arm pivoting cylinder 50 by rod and clevis 52, body clevis 54 and clevis pins 56, 58. Cylinder 50 may be of several types, however, in the preferred embodiment, it comprises a pneumatic cylinder having the standard intake and exhaust ports connected to a pneumatic supply source. These connections and the pneumatic supply source do not form a part of the present invention and are not shown in the drawings. With the above described construction, arms 22, 24 may be pivoted about shafts 34, 36 respectively and synchronizing gears 38, 40 assure that the arms will move equidistant relative to each other.

Extending between shaft bracket 20 and flange area 28 of contact arm housing 26 are a plurality of guide pins 60 and a compression spring biasing means 62 which provide resilient expansion means for contact arm assembly 18. Housing 26 is slidably received on shaft 10 so that but for its connection to bracket 20, it would be free to be moved longitudinally along the shaft. Guide pins 60 extend between bracket 20 and flange area 28 and limit the longitudinal movement of the housing. These guide pins may be mounted in any convenient known means. Spring biasing means 62 are received around shaft 10 between bracket 20 and flange 28. It is to be understood that any convenient biasing means could be used, however, in the preferred embodiment a coil spring is used.

Referring to FIGS. 1, 2, 4, 5, 6 and 7, it will be seen that on the opposite end from cylinder 50, upper contact arm 22 includes an upper contact assembly 64 and lower contact arm 24 includes a lower contact assembly 66. As these assemblies are identical in structure, it is only deemed necessary to describe upper contact assembly 64, it being understood that lower contact assembly 66 is identical thereto except where specifically noted. Referring particularly to FIGS. 4, 5, 6 and 7, it will be seen that assembly 64 includes a receiving base member affixed to contact arm 22 with intermediate electrical insulating material 70 spaced therebetween. The insulating material performs the function of preventing the electrical current supplied to the contact area from passing to the contact arms and the remainder of the apparatus. Receiving base 68 includes an aperture 69 therethrough of sufficient dimension so as to receive electrical source contact block 72, which in the preferred embodiment, is constructed from copper. Likewise, block 72 includes an aperture 73 therein so as to be able to receive workpiece contact portion 74, also constructed from copper in the preferred embodiment. Contact portion 74 is generally block-shaped and includes a generally V-shaped workpiece receiving slot 75 extending along the bottom side thereof.

Base 68 and insulator 70 may be affixed to contact arm 22 by any convenient means, and in the preferred embodiment, elongated bolts 76 passing through arm 22, insulator 70 and threadably received in base 68 are utilized. In order to insure good electrical contact between block 72 and contact portion 74, they are interconnected by a bolt 78 and nut 80 including a washer 82, although other convenient means could be used. Contact portion pivot dowels 84 are threadably received in receiving base 68, passing through contact block 72 and into contact portion 74. These pivot dowels are retained in position by any convenient means which, for example, comprise pins 85 extending through base 78 and the dowels. The result of this mounting is to permit the block and contact portion to be arcuately swung about dowels 84 a distance determined solely by the distance a between the top portion of contact block 72 and the bottom of the aperture 69 in receiving base 68. Included in contact block 72 is a coolant supply connection 86 receiving coolant supply line 88. The contact block also includes a coolant flow path 90 extending therethrough in order that the block and contact portion may be continuously cooled. Although many coolants could be utilized, in the preferred embodiment, water, from a source not shown and not forming a part of the invention, is utilized.

Figure 8:
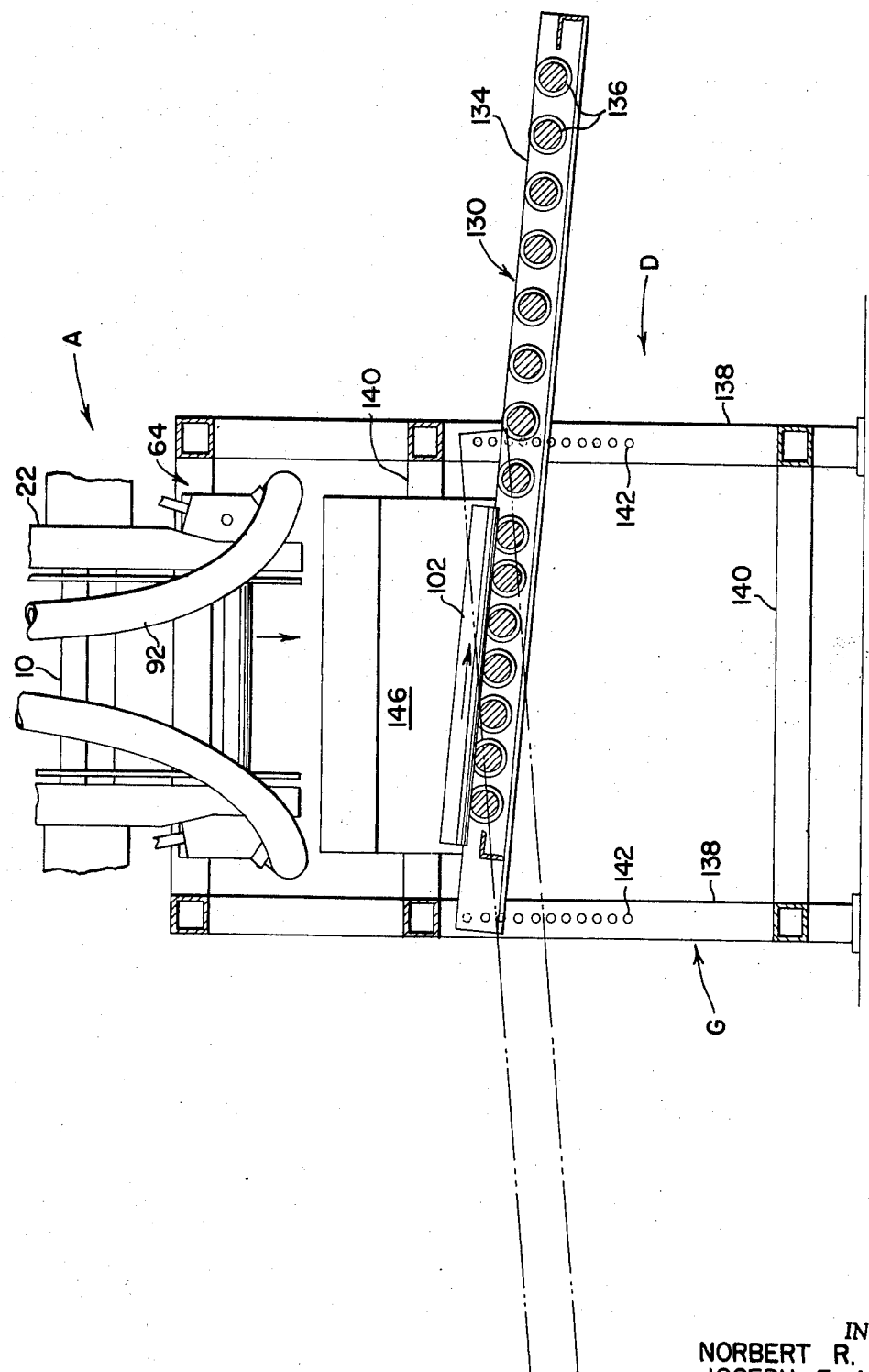
FIG. 8 is a view of the apparatus taken along lines 8—8 in FIG. 1 showing the element removal system.

Also mounted to electrical source contact block 72 is electrical supply cable 92 as is best shown in FIGS. 1, 2 and 8. The connection of cable 92 to block 72 is of the type normally associated with resistance heating cable connections, and in the preferred embodiment, comprises bolt means extending through the cable mounting adapters into block 72. The other end of cable 92 extends to electrical supply area E where it is connected in a manner generally associated with such cable connections. It should be particularly noted, and as best shown in FIG. 2, that electrical supply cable 92, as well as the other corresponding electrical supply cables, are shown as extending between contact arm assemblies 16, 18 as they traverse the distance from electrical supply area E to contact block 72 or their associated contact blocks. The significance of this construction will be more fully set forth below in the discussion relating to operation of the apparatus.

Associated with each contact arm assembly on heating portion A is a workpiece stripper generally designated 94 in FIGS. 2 and 4. Each workpiece stripper includes upper and lower stripper portions 96, 98 respectively. Portions 96, 98 are affixed to shaft 10 and are spaced apart from each other a distance greater than the cross-sectional dimension of the element but less than the distance between the contact assemblies when they are in the open position. The workpiece strippers assure that following heating, the workpieces will be positively removed from the resistance heating portion as the contact arm assemblies open.

Workpiece supply area B as shown in FIG. 1 includes a workpiece hopper or bin generally designated 100 of such dimension that it may store a substantial number of individual workpieces 102. Bin 100 includes open top area 104 into which the workpieces are placed and angularly disposed bottom portion 106 which directs workpieces 102 generally towards an open end area 108 by the force of gravity. Bin 100 and the configuration thereof are substantially similar to other gravity feed type of hoppers and does not form a part of the subject invention.

Adjacent opening 108 and generally coextensive therewith, is a cylindrical frictional separator and alignment roller 110. This roller is also substantially similar to other separators and aligners used for similar applications. Roller 110 acts to align workpieces 102 in order that they will properly pass into and through workpiece feed chute 112 which is maintained in position relative to the apparatus by chute mounting brackets 114. Chute 112 includes an open bottom end 116 in order that workpieces may be fed to workpiece feeding component C.

Workpiece feeder component C includes a workpiece feeder arm 118 having at one end thereof an aperture 119 to receive the workpieces. Feeder arm 118 is connected to a guide shaft 120 which is slideably received in an arm and shaft support 122. Feeder arm drive cylinder 124 which, in the preferred embodiment, is a pneumatic cylinder, is utilized to drive feeder arm 118 from its workpiece receiving position immediately adjacent open end 116 to a second position in proximity with contact arm assemblies 16, 18. Cylinder 124 and arm 118 are interconnected by a bracket 126.

Workpiece removal system D, best shown in FIGS. 1 and 8, comprises a roller conveyor generally designated 130. Conveyor 130 includes elongated L-shaped channel members 132, 134 having a plurality of roller elements 136 extending transversely therebetween. These rollers could be of several different types, however, in the preferred embodiment they comprise steel rollers which include a generally U-shaped necked portion 137 to accommodate and maintain workpieces 102 in the desired position as they pass therealong. Conveyor 130 is received on a conveyor stand comprised of a plurality of vertical frame members 138 and horizontal cross frame members 140. Each vertical frame member 138 includes a plurality of conveyor position mounting holes 142 extending longitudinally therealong so that conveyor level mounting pins 144 may be positioned therethrough in order to support the conveyor. An elongated rear baffle 146, coextensive with conveyor 130, and front baffle 148 (FIG. 1), also coextensive with conveyor 130, provide means whereby workpieces 102 are guided from resistance heating portion A to the conveyor rolls following heating.

The apparatus control area F includes the necessary electrical and pneumatic controls to properly control operation of the apparatus and is included at the rear portion thereof of the apparatus. However, it will be understood that these controls may be mounted wherever necessary to insure efficient and convenient apparatus operation.

Apparatus framework G includes a plurality of tubular vertical frame members 154, tubular horizontal frame members 156 and tubular angled frame members 158. It is to be understood that the frame is designed so as to mount the individual component assemblies in the required relative positions. Further, it is possible to include a sheet metal housing around this framework so as to protect the outside components from destructive elements oftentimes found in industrial environments, to protect workmen coming into contact with the apparatus and to present a single unit package.

Prior to operation of the apparatus, it is first necessary to set the transverse distance between the contact arm assemblies 16, 18, i.e., upper and lower contact assemblies 64, 66. In order to accomplish this, screws 160 in shaft bracket 20 are unloosened so that the shaft brackets and contact arm assemblies may be moved longitudinally along shaft 10. The desired distance between the contacts, of course, depends on the length of the workpieces to be heated. Generally, however, the contacts are set so as to grip the workpieces fairly close to the end points thereof. Once this initial setting has been completed, screws 160 may again be tightened so as to maintain the arm assemblies in that desired position. It may be further necessary, depending on the workpiece sizes, to make corresponding adjustments in workpiece supply area B, workpiece feeder C and workpiece removal system D. Once these additional initial settings have been completed, the apparatus is ready for operation.

First, a supply of workpieces 102 is provided in bin 100. These elements are fed, through the action of separator and alignment roller 110 and the gravity feed of chute 112 to workpiece feeder C. A workpiece received in recess 119 is then fed upwardly in the direction indicated as $b$ into proximity with resistance heating portion A. During this portion of apparatus operation, the contact arms assume the position indicated by the phantom lines of FIGS. 1 and 2. Contact arm pivoting cylinders 50 are then energized in order to close the arms so that upper and lower contact assemblies 64, 66 of each contact arm assembly 16, 18 grip workpiece 102 therebetween. In actuality, the workpiece is received in the V-shaped workpiece receiving slots 75 of workpiece contact portions 74 as best shown in FIGS. 1 and 6. Workpiece feeder arm 118 is then retracted to its original first position so as to be able to receive a second shaft element in aperture 119.

Electrical supply area E then supplies 60 cycle electrical current through cables 92 to their respective contact blocks 72. At the same time, coolant is supplied through coolant supply lines 88 in order to maintain blocks 72 and contact portions 74 below their melting temperature. The electrical energy supplied to contact portions 74 passes into and through workpiece 102 such that it is heated in the conventional manner generally associated with resistance type heating.

As is known in the art, V-shaped grooves 75 permit at least two areas of line contact upon each contact portion and are best shown in FIG. 6 for upper contact assembly 64 as contact areas $c$ and $d$. It should also be noted that as receiving slots 75 become worn, additional surface contact will be realized to the extent of a heavier line contact relationship.

During heating, of course, workpiece 102 will realize a certain amount of longitudinal expansion. To compensate for this, contact arm assemblies 16, 18 are slideably mounted on shaft 110 as hereinbefore discussed. As can best be seen in FIG. 2, and merely by way of example, contact arm assemblies 16, 18 may be moved from an initial position shown by phantom lines in FIG. 2 to a second position shown by the solid lines therein. The direction of movement is generally shown as directions $e, f$. Once the workpiece has been heated and released to the workpiece removal system, biasing means 62 will direct the contact arm assemblies back to their initial predetermined set position.

By way of example, it has been found that the heating time for a ⅜" diameter by 8" long steel shaft to be heated to 2300° F. is approximately ten seconds and the heating time for a 1⅝" diameter by 18" long shaft to the same temperature is approximately forty-five seconds. Again, electrical supply cables 92 extend between arm assemblies 16, 18 as it has been found that when the cables are extended along the outside of the arm assemblies, an inductive type heating system is established within the loop formed between the cables. The result of this inductive heating system is to raise the temperature of the various apparatus components. Further, and more importantly, it has been found that by the extending cables between the arm assemblies, improved resistance heating is accomplished. By experimentation, it has been found that for some workpieces, the resistance heating results with the cables between the arm assemblies was 20% more efficient than heating identical workpieces with the cables on the outside of the arm assemblies.

FIG. 4 best shows the utility of the arcuate movement provided for each contact block 72 and workpiece contact portion 74 combination which movement generally designated as e in FIG. 4. In operation, this movement provides means for compensating for transverse run-out in any of the workpieces so that contact assemblies 64, 66 are able to maintain their line-surface contact therewith. Since the contact blocks and contact portions are pivotally mounted relative to their contact arms, the adjustment for transverse run-out is automatically accomplished when the arms assume the workpiece clamping position.

Once the desired workpiece heating has been attained, contact arm pivoting cylinders 50 are retracted so as to move upper and lower contact assemblies to their spaced apart position in order that heated workpiece 102 may be removed therefrom. The control sequence and controls of the apparatus do not form a part of the present invention and are not shown in the drawings, it being understood that those employed are standard in the art.

As contact assemblies 64, 66 assume their second position, workpiece 102 is removed by gravity in the direction generally designated g and is guided by workpiece baffles 146, 148 into roller conveyor 130. Should the heated workpiece stick to one of the contact portions, strippers 98 assure that it will be stripped therefrom. At the same time, a new workpiece 102 is fed by workpiece feeder C into proximity with resistance heating portion A.

As best shown in FIG. 8, conveyor level mounting pins 144 may be moved to any combination of positions in holes 142. As shown in that figure, the workpieces received in conveyor 130 will be fed by gravity out of the right side of the apparatus. Likewise, and as shown by phantom lines, the conveyor could be moved so as to feed the heated workpieces out of the opposite side of the apparatus. This type of conveyor arrangement provides for versatility of use so that the apparatus could be used to feed two separate production lines without the necessity for elaborate part-moving equipment. It will be understood that other workpiece conveying systems could also be utilized such as for example the common motorized continuous belt-type conveyor.

The invention has been described with reference to the preferred embodiment. Obviously, modifications and alterations will occur to others upon the reading and understanding of this specification. It is my intention to include all such modifications and alterations in so far as they come within the scope of the appended claims or the equivalence thereof.

Having thus described my invention I now claim:

1. A resistance heating apparatus for heating an elongated workpiece having a longitudinal axis, said apparatus comprising:
    first and second spaced apart workpiece heating contacts, each of said contacts including electrically conductive first and second contact portions, each of said portions being mounted for movement relative to its associated portion between an opened first position and a second heating position with said workpiece clamped therebetween;
    means for moving said portions between said first and second positions;
    means for providing at least three areas of line contact between the first and second contact portions which comprise each of said first and second heating contacts and said workpiece when said portions are in said second position;
    means for permitting arcuate movement of said portions about an axis formed by a line drawn generally perpendicular to a plane in which all said contact portions lie; and,
    means for supplying electrical energy to said contact portions for resistance heating said workpiece when said portions are in said second position.

2. The apparatus as defined in claim 1 further including means for removing said workpiece from a clamped relationship with said portions when said portions are moved from said second to said first position.

3. The apparatus as defined in claim 1 further including means for selectively feeding said workpiece from a storage area remote from said contacts into proximity with said contacts.

4. The apparatus as defined in claim 1 wherein each of said portions is mounted to a contact arm, said arms being pivotally mounted for movement between said first and second positions on a mounting shaft dipsosed generally coextensive with said workpiece longitudinal axis and including means for adjusting the transverse distance between said first and second contacts along said shaft and wherein said moving means comprise means associated with said arms for driving said arms between said first and second positions.

5. The apparatus as defined in claim 4 wherein said adjusting means includes means for allowing said contact arms to be resiliently displaced relative to each other along said mounting shaft during heating.

6. The apparatus as defined in claim 4 wherein said supply means is interconnected with said portions by electrical cables, said cables extending generally coextensive with and between said contact arms for said first and second heating contacts.

7. The apparatus as defined in claim 1 wherein said means for providing at least three areas of line contact comprises at least one of said portions in each said first and second contacts including a workpiece receiving area coextensive with said workpiece when said contacts are in said second position whereby said workpiece is at least partially received therein.

8. The apparatus as defined in claim 7 wherein each said portion of said contacts includes one of said receiving areas and said areas are generally V-shaped.

9. In a resistance heating apparatus for heating an elongated workpiece having a longitudinal axis, said apparatus including first and second heating contacts which each include first and second electrically conductive contact portions mounted for movement between a first spaced apart position and a second heating position with said workpiece clamped therebetween, means for moving said contact portions between said first and second positions, and means for supplying electrical energy to said contact portions, the improvement comprising:
    means for permitting arcuate movement of each said first and second portion about an axis formed by a line drawn generally perpendicular to a plane in which all said contact portions lie.

10. The improvement as defined in claim 9 wherein each said contact portion is disposed on a contact arm and said moving means are in operative engagement with said contact arms, said means for permitting arcuate movement comprising means for pivotally mounting each said portion to its associated contact arm.

11. The improvement as defined in claim 10 further including a contact portion receiving base mounted to each of said contact arms, said means for pivotally mounting comprising at least one mounting pin element extending through each of said bases and into the associated of said contact portions.

References Cited
UNITED STATES PATENTS

| | | | |
|---|---|---|---|
| 3,548,149 | 12/1970 | Rizzolo | 219—156 |
| 1,586,314 | 5/1926 | Kiefer | 269—238 |
| 1,299,931 | 4/1919 | Geisenhöner | 219—156 |
| 1,075,384 | 10/1913 | Seidel | 269—238 |
| 720,256 | 2/1903 | Kleinschmidt | 219—161 |
| 3,418,447 | 12/1968 | Rizzolo et al. | 219—156 |
| 1,457,513 | 6/1923 | Fay | 219—161 |

JOSEPH V. TRUHE, Primary Examiner

G. A. MONTANYE, Assistant Examiner

U.S. Cl. X.R.

219—56, 161